United States Patent
Sanders

(10) Patent No.: US 11,204,123 B2
(45) Date of Patent: Dec. 21, 2021

(54) PIPE REPAIR APPARATUS AND METHOD

(71) Applicant: Simon Sanders, Salisbury (GB)

(72) Inventor: Simon Sanders, Salisbury (GB)

(*) Notice: Subject to any disclaimer, the term of this patent is extended or adjusted under 35 U.S.C. 154(b) by 0 days.

(21) Appl. No.: 16/632,087

(22) PCT Filed: Jul. 19, 2018

(86) PCT No.: PCT/GB2018/052048
§ 371 (c)(1),
(2) Date: Jan. 17, 2020

(87) PCT Pub. No.: WO2019/016557
PCT Pub. Date: Jan. 24, 2019

(65) Prior Publication Data
US 2020/0166171 A1    May 28, 2020

(30) Foreign Application Priority Data
Jul. 20, 2017  (GB) ..................................... 1711648

(51) Int. Cl.
*F16L 55/163*  (2006.01)
*F16L 55/165*  (2006.01)
*F16L 55/18*   (2006.01)

(52) U.S. Cl.
CPC ......... *F16L 55/1651* (2013.01); *F16L 55/163* (2013.01); *F16L 55/18* (2013.01)

(58) Field of Classification Search
CPC ..... F16L 55/1651; F16L 55/165; F16L 55/18; F16L 55/163; F16L 55/1645; B29C 63/36; B29C 63/346

USPC ...................... 138/97, 98; 156/294, 423, 287
See application file for complete search history.

(56) References Cited

U.S. PATENT DOCUMENTS

| | | | | |
|---|---|---|---|---|
| 4,680,066 A | * | 7/1987 | Wood | B29C 63/0069 156/156 |
| 5,816,293 A | | 10/1998 | Kiest, Jr. | |
| 5,855,729 A | * | 1/1999 | Kiest, Jr. | B29C 63/36 156/423 |
| 2011/0247755 A1 | * | 10/2011 | Sanders | F16L 55/1651 156/294 |
| 2015/0151484 A1 | * | 6/2015 | Sanders | F16L 55/18 156/287 |

(Continued)

FOREIGN PATENT DOCUMENTS

EP    2379932    10/2011

*Primary Examiner* — Patrick F Brinson
(74) *Attorney, Agent, or Firm* — Blanchard & Associates

(57) ABSTRACT

An eversible liner is provided for insertion into a pipe for pipe repair. The liner comprises: an extender tube; a connector portion; and a liner tube; a first end of said extender tube being in substantially fluid tight communication with a first end of said connector portion; a second end of said connector portion forming a substantially fluid tight, detachable connection with a first end of said liner tube to form a first connection; said extender tube, connector portion and liner tube forming a continuous tubular construction which is capable of eversion; wherein the liner comprises a sealing member arranged to inhibit passage of a fluid from the liner tube to the extender tube or the connector portion. The present invention aims to improve detachability of a liner tube from an extender tube over currently available technology, while providing improved accuracy when repairing a pipe with said liner tube.

23 Claims, 4 Drawing Sheets

(56) References Cited

U.S. PATENT DOCUMENTS

Figure 1:
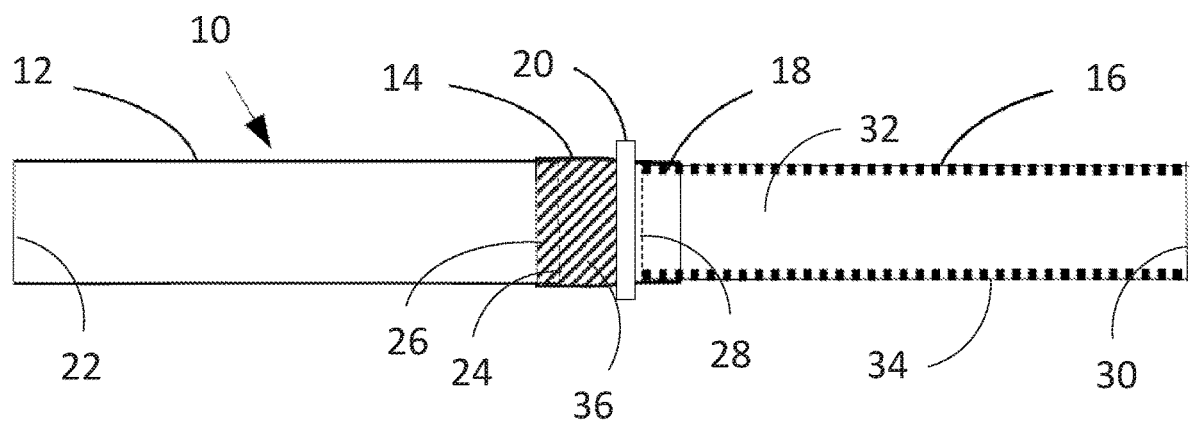

2017/0326784 A1* 11/2017 Sanders ................ F16L 55/18
2019/0301658 A1* 10/2019 Sanders .............. F16L 55/1651

* cited by examiner

```
┌─────────────────────────────────────────────────────────────┐
│   Providing a liner for insertion into a pipe, said liner   │
│   comprising: an extender tube; a connector portion; and    │
│   a liner tube; a first end of said extender tube being in  │
│   substantially fluid tight communication with a first end  │
│   of said connector portion; a second end of said connector │
│   portion forming a substantially fluid tight, detachable   │
│   connection with a first end of said liner tube to form a  │
│   first connection; said extender tube, connector portion   │
│   and liner tube forming a continuous tubular construction  │
│   which is capable of eversion; wherein the liner comprises │
│   a sealing member arranged to inhibit passage of a fluid   │
│   from the liner tube to the extender tube or the connector │
│   portion.                                                  │
└─────────────────────────────────────────────────────────────┘
                              │
                              ▼
┌─────────────────────────────────────────────────────────────┐
│   Everting the liner such that said liner becomes           │
│   positioned at a desired position in the pipe.             │
└─────────────────────────────────────────────────────────────┘
                              │
                              ▼
┌─────────────────────────────────────────────────────────────┐
│   Applying a first force to said extender tube, said first  │
│   force transmitted along said extender tube to detach the  │
│   connector portion from the liner tube.                    │
└─────────────────────────────────────────────────────────────┘
                              │
                              ▼
┌─────────────────────────────────────────────────────────────┐
│   Removing said extender tube and said connector portion    │
│   from said pipe.                                           │
└─────────────────────────────────────────────────────────────┘
```

FIG. 4

PIPE REPAIR APPARATUS AND METHOD

FIELD OF THE INVENTION

The present invention relates to a liner for insertion into a pipe, and more particularly to a pipe liner forming a continuous tubular construction which is capable of eversion.

BACKGROUND TO THE INVENTION

It is common to repair defective pipes, especially those carrying fluids, with the insertion of a liner. Such liners typically comprise a combination of materials that enable the liner to be flexible as it is inserted, whilst simultaneously allowing the liner to harden once it has been positioned in the pipe to be lined. The most common type of liner is a cured in place pipe liner (CIPP liner), comprising an elongate tube of a flexible material such as felt. This flexible material is impregnated with a resin which hardens, or may be caused to harden, once the liner is inserted into a pipe. Depending on the resin or resins used, this hardening process may occur under atmospheric conditions or under the influence of heat or steam.

When positioning the liner in a pipe to be lined, it is common to place the liner inside the diameter of the pipe and evert it, such that what was previously the external surface of the liner forms the interior surface of the liner. Eversion is most usually achieved by positioning the end of the liner so that it passes through a nozzle and is turned back over and fastened in place round the nozzle so that, when fluid such as air or water is introduced under pressure through the nozzle, the liner may be caused to progressively evert along its length as it passes through the nozzle. The everting end of the liner may be inserted in the end of a pipe, and the continuing application of fluid under pressure causes the liner to evert and extend into the pipe.

Once the liner is fully inserted it is held in position in the pipe to be lined by maintaining pressure within it, which requires provision for the distal end of the liner to be closed to retain the pressurising fluid, or by means of a length of pressurisable tubing, often inserted into the pipe alongside the liner.

However, this method of installing a pipe liner is not without its disadvantages. Firstly, an everted liner installed using the aforementioned method must extend from a point of access to the pipe being lined, often remote from the area which requires repair. It is not possible for the liner to start at a chosen point within the pipe, such as beyond a junction between two or more pipes. Secondly, part of the cured liner will always project from the access end of the pipe being lined and any excess liner must be trimmed, alongside the removal of all spillage and contamination. Thirdly, existing methods for pressurising an everted liner frequently require an operator to enter a manhole and be present for the lining operation. Pressurising an everted liner may be undertaken by closing the distal end or by the use of an inversion hose.

The aforementioned problems are considered in EP 2,379,932. This application focuses on increasing the ease of installation of a pipe liner by providing a method, using an extender tube and a liner tube, which allows the liner to be placed at specific, desired locations inside a pipe. In this way, the costs of lining a pipe are reduced due to an increased ease of installation and a reduction in waste materials. Furthermore, the ability to line specific sections of pipe reduces the difficulties associated with lining complex piping system with junctions between multiple pipes.

However, whilst EP 2,379,932 provides a contribution to the state of the art in this area of technology, it does not provide the perfect solution. In the method contained within EP 2,379,932, the connection between the liner tube and the extender tube is located inside the pipe to be lined, potentially a significant distance from those involved in the lining process.

Using the technology disclosed in EP 2,379,932, combined liner and extender tubes are limited to small diameters (100 mm) where the liner tube has been impregnated with a polyester resin, a material that cures exothermically while emitting a styrene vapour. Heat from the curing process and the solvent properties of the styrene vapour have been found to weaken adhesives used to join the liner and the extender tube and, as such, at these small diameters it is possible to detach the extender tube with the application of a force on the extender tube.

However, the method described in EP 2,379,932 is less suitable where other resins are used in the liner tube, and the curing process of these resins does not weaken the adhesive bond between the liner tube and the extender tube. Additionally, even if a polyester resin is used, this method is problematic at larger pipe diameters.

Alternative methods are available, including the use of solvents, heat, peeling forces or mechanically destructive actions. However, such methods are frequently difficult to apply, especially where the join between the extender tube and the liner tube is remote from the point of access.

An improved method of installing CIPP repair liners in pipes such as sewer pipes using an eversible extender-tube that is detachably joined to the liner to form a continuous eversible tube is described in International Patent Application No. PCT/GB2017/051502.

The method disclosed therein does, however, still suffer issues relating to accuracy of targeting a required region in a pipe for repair using a liner. Lack of accuracy frequently presents issues of misguiding the liner to the required site of repair, or providing an excess of liner material than that which would otherwise be sufficient to carry out the repair. This issue presents disadvantages such as a waste of materials, increased labour time, and related financial concerns.

Provision of a suitable resin into a liner tube such as that disclosed in PCT/GB2017/051502 and the current state of the art has also proven to be problematic. Liquid resin frequently contacts extraneous areas of such constructions, such as for example, extender tubes used to place the liner in position within the pipe. Contact of the resin with areas such as an extender tube frequently causes issues when attempting to detach a liner from said areas.

It is therefore desirable to provide a pipe liner ensuring effective detachability of an extender tube from a liner, including an aid to the accuracy of positioning the liner used.

SUMMARY OF THE INVENTION

In accordance with a first aspect of the present invention, there is provided a liner for insertion into a pipe, said liner comprising: an extender tube; a connector portion; and a liner tube; a first end of said extender tube being in substantially fluid tight communication with a first end of said connector portion; a second end of said connector portion forming a substantially fluid tight, detachable connection with a first end of said liner tube to form a first connection; said extender tube, connector portion and liner tube forming a continuous tubular construction which is capable of eversion; wherein the liner comprises a sealing member arranged to inhibit passage of a fluid from the liner tube to the extender tube or the connector portion.

The invention provides an eversible tubular liner, having a liner tube with a lumen which preferably comprises an absorbent material, such as, for example, felt. The liner tube has a first end in contact with a connector portion, and a second end through which the liner tube is preferably capable of being impregnated with a curable or hardenable fluid, such as, for example, resin. The liner further comprises an eversible extender-tube having a first end, and a second end which is in contact with the connector portion to provide a continuous tube that is capable of being everted. Preferably at least a part of the liner tube and/or the connector portion and/or the extender tube is comprised of a flexible material, such as, for example, plastic-coated fabric. In preferable embodiments the connector portion is a portion of the extender tube or is immovably affixed to the extender tube. Additional embodiments will be apparent wherein the connector portion is separate to the extender tube, such as, for example, a collar arranged to connect the liner tube to the extender tube.

In a preferred embodiment of the invention the connector portion comprises one or more additional components, and is preferably of a translucent material. Preferably in such embodiments, any resin or other material that may enter the connector portion will be visible to an external observer.

Preferably the liner comprises a lay-flat configuration, and wherein in the lay-flat configuration, the connector portion and the liner tube are substantially planar and each comprise a first substantially rectangular face and a second substantially rectangular face. Preferably in the lay flat configuration, the extender tube is substantially planar and comprises a first substantially rectangular face and a second substantially rectangular face.

Preferably, the sealing member is arranged to inhibit passage of a fluid from the liner tube to the extender tube or the connector portion when the liner is in the lay-flat configuration The liner is preferably arranged to be in a lay-flat configuration prior to being everted. Parts of the liner in the lay-flat configuration may preferably bulge temporarily as a resin material passes through the liner tube during an impregnation process.

Resin is preferably introduced into the liner at the second end of the liner tube and is moved progressively through the liner tube toward the first end of the liner tube. It is preferable that resin should not leak out of the first end of the liner tube into the connector portion or the extender tube. Any resin that leaks from the second end of the liner tube into the connector portion or the extender tube may hinder separation or detachment of the connector portion and/or extender tube from the liner tube following hardening of the resin. Continuing to detach the extender tube and/or connector portion from the liner tube following such an event may potentially cause unevenness in the finished lining of a pipe and therefore potentially ineffectual repair.

Resin is preferably introduced into the liner at the second end of the liner tube and is moved progressively through the liner tube toward the first end of the liner tube. It is preferable that resin should not leak out of the first end of the liner tube into the connector portion or the extender tube. Any resin that leaks from the second end of the liner tube into the connector portion or the extender tube may hinder separation or detachment of the connector portion and/or extender tube from the liner tube following hardening of the resin. Continuing to detach the extender tube and/or connector portion from the liner tube following such an event may potentially cause unevenness in the finished lining of a pipe and therefore potentially cause ineffectual repair.

Preferably the sealing member is arranged to collapse an inner surface or lumen of said liner tube at a sealed portion, such that the sealed portion forms a substantially fluid tight seal.

Preferably the sealing member comprises a clamping member.

Preferably the clamping member comprises a first flat surface; and a second flat surface arranged to oppose the first flat surface; the first flat surface and the second flat surface being an adjustable distance from one another.

In preferable embodiments, the first flat surface and the second flat surface of the clamping member are arranged to communicate with the first substantially rectangular face and the second substantially rectangular face of the connector portion and/or the liner tube respectively, when the liner tube is in the lay-flat configuration.

Preferably the first flat surface and the second flat surface comprise a compressive material. Preferably the compressive material is rubber.

Preferably the clamping member comprises a compression member arranged to urge the first flat surface toward the second flat surface, such that a portion of the liner tube is compressed. In preferable embodiments a means are provided to cause the flat surfaces of the clamp to be pressed together, for example by one or more threaded screws or clips applied to the ends of the bars in a manner that causes pressure to be applied or by enclosing the bars within a compressing device such as one or more sets of locking pliers which are operated to apply suitable pressure. A compressible strip of a material such as rubber may cover part or all of one or both flat faces of the sealing clamp bars to spread the compressive force applied by the bars.

Preferably the sealing member comprises an oil-based material or a limited-strength adhesive, the sealing member coating an interior surface of said connector portion and/or said liner tube.

A sealing mechanism is preferably provided in the form of a sealant which may take the form of a sealing clamp. The sealing clamp preferably comprises a first and a second flat surface, each flat surface being at least as long as the lay-flat width (being the width when in the lay-flat configuration) of the connector portion or second end of the extender tube where either meets the first end of the liner tube. The sealing member is preferably applied across the width of the connector portion or extender tube proximal to the first end of the liner tube, and/or across the width of the liner tube, each of the first and second flat surfaces of the sealing clamp resting against the first and second substantially rectangular faces of the connector portion or extender tube, and/or the liner tube, in the lay-flat configuration. In a preferable embodiment, the connector tube is in fluid tight connection with the liner tube due to an overlap of said connector tube with said liner tube, such that the connector tube and the liner tube are arranged concentrically.

Preferably the liner comprises a suction mechanism arranged to draw a liquid from the second end of said liner tube toward the first end of said liner tube, the suction mechanism comprising a suction conduit positioned proximal to the first end of the liner tube and having fluid access to the interior of the liner tube.

Preferably the suction conduit has fluid access to the interior of the liner tube through an aperture positioned in the liner tube.

Preferably the liner tube comprises an absorbent material.

Preferably the absorbent material is one selected from the range: felt, fabric, mesh.

Preferably an interior surface of the connector portion and/or the extender tube comprises an adhesive-resistant material.

Preferably the adhesive-resistant material forms a coating layer on the interior surface.

Preferably a surface of the extender tube and/or the connector portion is arranged to accept and retain a marking applied thereto.

Preferably the marking is made using a writing implement.

Preferably the second connection comprises an adhesive material comprising an adhesive strength.

Preferably the adhesive strength of the adhesive material is arranged to be reduced during or following the communication of one selected from the range:
heat,
a solvent,
an oil-based material;
with the adhesive material.

Preferably the connector portion is part of the extender tube.

Preferably the first connection is provided using an adhesive material. Preferably the adhesive is a limited-strength adhesive. The limited strength adhesive preferably comprises a strength, the strength being arranged to be overcome by a tensile force applied to the connector portion. Preferably the force is a peeling force. In embodiments wherein the force is a peeling force, the force is used to peel the connector portion from the liner tube.

Preferably the first connection comprises a frangible material. Preferably the first connection provided by the adhesive is arranged to be overcome by a tensile force applied to the connector portion. Preferably the force is a breaking force. In embodiments wherein the force is a breaking force, the force is used to break the frangible first connection.

Preferably the liner comprises a pressurizing bladder arranged for use therewith. The pressurizing bladder preferably comprises an inflatable container, preferably having an inflated diameter substantially equal to a diameter of the lumen of the liner tube. Preferably the pressurizing bladder comprises a coating layer located on at least a portion of an outer surface thereof, the coating layer preferably comprising a fluid compound, the fluid compound preferably comprising an anti-adhesive material. Preferably the anti-adhesive material is arranged to soften; solubilise; and/or weaken the adhesive strength of; an adhesive material. Preferably the adhesive material is used in the first connection. Preferably the anti-adhesive material is an oil-based or oil-comprising compound.

In accordance with a second aspect of the present invention, there is provided a method of repairing a pipe, the method comprising the steps of:
a) providing a liner according to the first aspect of the present invention;
b) everting the liner such that said liner becomes positioned at a desired position in a pipe to be lined;
c) applying a first force to said extender tube, said first force transmitted along said extender tube to detach the connector portion from the liner tube; and
d) removing said extender tube and said connector portion from said pipe.

Preferably the first force comprises a peeling force.

Preferably the extender tube and/or the connector portion comprises a translucent material, and the method comprises an additional step between step a) and step b), the step comprising:
marking an exterior surface of the connector portion and/or the extender tube at a portion comprising the translucent or a transparent material.

Preferably the desired position in a pipe to be lined is determined by the marking.

DETAILED DESCRIPTION

Figure 2:
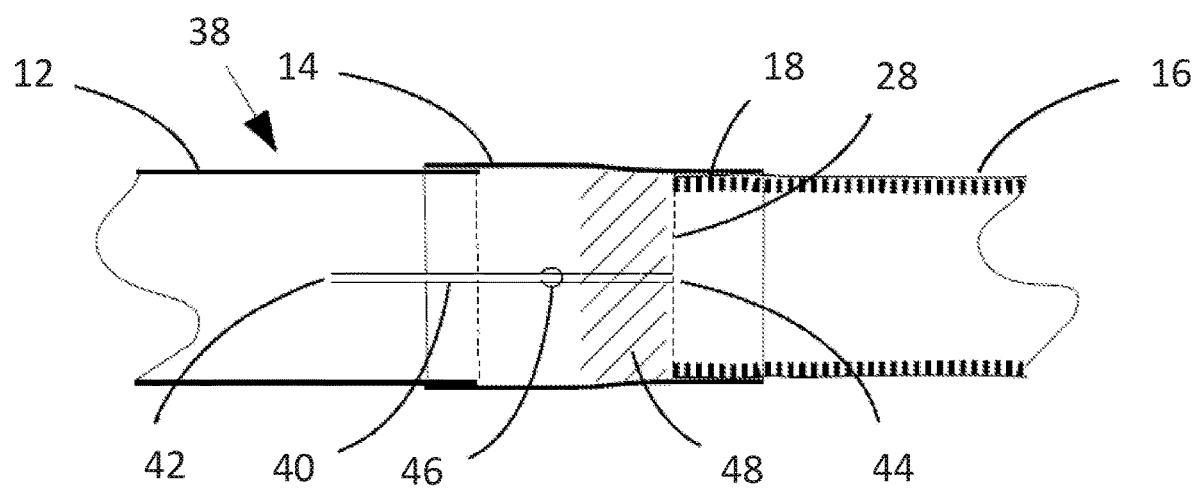
Figure 3:
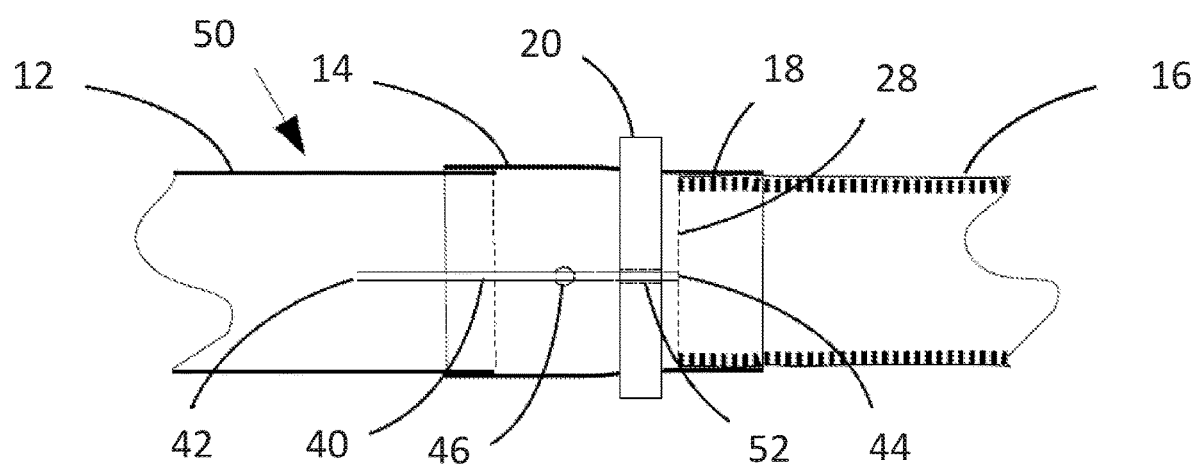

Specific embodiments will now be described by way of example only, and with reference to the accompanying drawings, in which:

FIG. 1 shows a sectional view of an example embodiment of a liner in accordance with the first aspect of the present invention for use in a method according to the second aspect of the present invention;

FIG. 2 provides a sectional view of an additional example embodiment of a liner in accordance with the first aspect of the present invention;

FIG. 3 provides a sectional view of an additional example embodiment of a liner in accordance with the first aspect of the present invention; and FIG. 4 provides a flowchart of steps of an example embodiment of a method according to the second aspect of the present invention.

FIG. 1 shows a sectional view of an example embodiment of a liner 10 in accordance with the first aspect of the present invention, the liner 10 comprising an extender tube 12 comprising a main body having a first end 22 and a second end 24. Affixed to the second end 24 of the extender tube 12 is a tubular connector portion 14. The liner further comprises a liner tube 16 having a first end 28 and a second end 30. The first end 28 of the liner tube 16 is detachably joined to the connector portion 14 by an overlapping join 18, at an end of the connector portion 14 opposing the extender tube 12. The liner tube 16 comprises a lumen 32 defining an inner surface 34 of the liner tube 16, the inner surface 34 being coated with an absorbent material. In the embodiment shown in FIG. 1, the absorbent material is felt.

A sealing member 20, taking the form of a clamp having a first flat surface and an opposing a second flat surface, is positioned about the connector portion 14 proximal to the first end 26 of the liner tube 16.

In the embodiment shown, the extender tube 12, the connector portion 14 and the liner tube 16 are comprised of a flexible material such that the liner comprises a lay-flat configuration as shown in FIG. 1. In the lay-flat configuration shown, the extender tube 12, connector portion 14 and the liner tube 16 are substantially planar and each comprise a first substantially rectangular face and a second substantially rectangular face. The first flat surface and the opposing second flat surface of the clamp 20 are positioned across the width of the first substantially rectangular face and a second substantially rectangular face of the connector portion 14 respectively, the connector portion 14 in the lay-flat configuration shown. The clamp 20 further comprises a compression member (not shown), taking the form of a threaded screw arranged to urge the first flat surface and the second flat surface toward one another and to collapse an inner surface of the connector portion 14 and the liner tube 16 at a sealed portion 18 at the first end 28 of the liner tube 16, such that the sealed portion forms a substantially fluid tight seal. In the embodiment shown, the first flat surface and the second flat surface of the clamp 20 comprise a compressive rubber surface, which preferably protects the outer surface of the connector portion 14 and the liner tube 16 from damage when the seal is created.

In the embodiment 10 shown, the extender tube 12 and connector portion 14 are comprised of a transparent material arranged to accept a marking on the exterior surface thereof using a pen. In use the marking (not shown) is used to aid the positioning of the liner 10 in a pipeline according to a region within said pipe requiring repair.

In use, the liner tube 16 is impregnated with a hardenable material, such as resin, which is introduced at the second end 30 of the liner tube 16 and urged toward the first end 28 of the liner tube 16. The sealing member 20 prevents resin from entering the connector portion 14 or the extender tube 12. The liner 10 is then inserted into a pipe with the aid of the marking on the extender tube 12. A fluid is passed through the liner 10 such that the liner 10 is everted. The transparent material of the extender tube 12 and the connector portion 14 enable a user to see the marking when the liner is everted, thus aiding accuracy and precision in the placement of the liner.

As a precaution against the possibility that a user may allow resin to enter the extender tube 12, where it may form an adhesive join between the extender tube 12 and the inner surface of the pipe being lined, and to prevent such a join, an adhesive-resistant coating of a material such as silicone grease is preferably applied to at least part of the inner surface of the extender tube.

An example area 36 where an adhesive-resistant coating may be applied to the inner surface of the extender-tube is indicated in FIG. 1.

In a preferred embodiment of the invention, the adhesive material chosen for joining the connector portion 14 to the liner tube 16, at a detachable join 18, is susceptible to softening by an organic fluid such as an oil or grease that is capable of being forced into the adhesive join 18 under pressure.

Preferably a kit of parts comprising a liner according to the first aspect of the present invention further comprises a pressurising bladder, whereof a surface is coated with the said organic fluid, and the bladder is inserted into the liner in a manner such that the said organic fluid makes contact with the adhesive join described. The said pressurising bladder is pressurised, forcing the organic fluid into the adhesive material causing the adhesive material to be softened. In an alternative embodiment, the organic fluid is provided as part of an adhesive-resistant coating that is applied to the inner surface of the connector portion.

In order to enable accuracy in positioning the repair liner within the pipe being lined and also to allow alignment of the pressurising bladder, particularly where a coating of organic fluid intended to soften the adhesive join between the liner tube and the conector portion is confined to a fixed location on the surface of the pressurising bladder, it is advantageous to apply visible marks to the extender tube, connector portion, and to the pressurizing bladder and to any rods that may be used to insert it. It is therefore advantageous that the extender tube and/or connector portion should be of a transparent or translucent material such that marks may be applied to the extender tube and/or connector portion prior to it being everted that are discernible through the wall of the extender tube and/or connector portion after it has been everted. Preferably that marks that are discernible through the wall of the extender tube and/or connector portion may be applied to any bladder or other item that is inserted into it.

Resin impregnation of CIPP liners may be improved by the use of suction to draw the resin through a liner from a first end to a second end. This is achieved in the present invention by sealing the first end of the liner tube (with the clamp) and forming an access hole in the liner tube suitable for applying a suction conduit attached to a suction source. This method enables a hardenable material, such as for example resin, to be drawn as far as the access hole only, and it is usually necessary either to knead and otherwise work the resin into the remaining part of the liner tube or to remove the remaining part of the liner tube altogether. In order to avoid having to knead or otherwise work the resin into a remaining part of the liner tube, a preferred method for applying suction for resin impregnation of an extended liner such as that described is to apply a suction conduit such as a tube to the first end of the liner. Accordingly, in appreciable embodiments, a suction conduit is provided with a first end and a second end that passes through all or part of the extender-tube. The first end of the suction conduit is connected to a suction source and the second end is positioned so that suction is applied to the absorbent material of the liner.

In one embodiment of this part of the invention, the material of the part of the extender-tube that encloses the suction conduit and is adjacent to the second end of the liner is capable of forming a seal around it sufficient to maintain suction within the liner, preferably achieved by drawing the opposing faces of the inner surface of the extender-tube air-tightly together over the suction conduit with, if necessary or preferred, an intermediate fluid such as oil or grease covering at least part of the said inner surface, to enhance the seal. Alternatively, a suction-enabling seal such as may be achieved using duct-tape may be applied at the first end of the extender-tube and removed together with the suction conduit when resin impregnation is complete.

A preferred embodiment of the invention provides a hole in the wall of the extender-tube or the attachment collar through which the suction conduit passes. The first end of the suction conduit is connected to a suction source and the second end is positioned so that it is in sufficient contact with the absorbent material of the liner for suction to be applied to it effectively. The application of suction within the extended liner and, in particular, within the extender-tube causes the inner surfaces of the extended liner and the extender-tube to be drawn together and pressed together tightly and to press tightly round the suction conduit. In one embodiment of this part of the invention, the material of the part of the extender-tube that encloses the suction conduit and is adjacent to the second end of the liner, preferably but not necessarily coated with a suitable compound such as oil or grease, is, when suction is applied, capable of forming a seal around the suction conduit sufficient to support the suction and preferably but not necessarily may also be capable of forming a seal at the end of the liner that prevents leakage of resin into the end of the extender-tube. Alternatively, the invention provides a sealing clamp that provides a closure sufficient to enable effective suction within the liner together with means for the suction conduit to pass between the bars of the sealing clamp without compromising the effectiveness of the sealing clamp in retaining suction and retaining resin or of the suction conduit in transferring suction. In a preferred embodiment of this part of the invention, a channel is provided on one of the faces of one or both of the sealing clamp bars configured so as to enable the suction conduit to pass from the side of the sealing clamp that is furthest from the second end of the liner to the side that is nearest to the second end of the liner. In both of the methods wherein the suction conduit passes through a hole in the wall of the extender tube or connector portion, suction is applied to draw the resin through the liner tube and, when it is no longer required, the sealing clamp, if used, is removed, the suction conduit is withdrawn and, if necessary, a sealing closure such as an adhesive patch is applied to the hole in the wall of the extender tube or connector portion.

FIG. 2 shows a sectional view of a liner in accordance with the first aspect of the present invention, substantially as described for FIG. 1 and reference numerals for parts corresponding to equivalent parts in FIG. 1 have been used. The liner 38 of FIG. 2 comprises a suction member comprising a suction conduit 40 having a first end 42 leading to a suction source (not shown) and a second end 44 extending through an aperture 46 located in the lining of the connector portion 14 and positioned in fluid communication with the lumen 32 of the liner tube 16. In use, the suction conduit 40 is used to draw a hardenable fluid used to impregnate the second end of the liner tube 16 toward the first end of the liner tube 16. As suction is applied to the lumen of the liner tube 16 by the suction conduit 40, a part 48 of the connector portion 14 surrounding the suction conduit 40 forms a sealing member creating a fluid-tight seal around the circumference of the suction conduit 40, limiting access to the connector portion 14 and the extender tube 12 for the hardenable fluid. Embodiments will be appreciated wherein the sealing member 24 is reinforced using an oil-based material or limited-strength adhesive substantially as hereinbefore described.

FIG. 3 shows an additional embodiment 50 of the first aspect of the present invention substantially as shown and described for FIG. 3, wherein the sealing member 20 is a clamp as shown for the embodiment of FIG. 1. The clamp 20 of FIG. 3 comprises an aperture 52 sized to accept the suction conduit 40 such that a fluid-tight seal is provided around the suction conduit.

As a precaution against the possibility that, in the absence or failure of a sealing clamp, a user may allow resin to enter the extender tube where it may form an adhesive bond between the extender tube and the inner surface of the pipe being lined, and to prevent such a bond, an adhesive-resistant coating of a material such as silicone grease is can be applied to at least part of the inner surface of the extender tube. Such a coating may also serve to improve the seal provided over the area 48 in FIG. 3.

In a preferred embodiment of the invention, the adhesive material chosen for joining the connector portion or extender tube to the liner tube is susceptible to softening by a fluid compound, such as for example an oil-based material or grease, that is capable of being forced into the adhesive join under pressure. Additional fluid compounds will be appreciated by the skilled person, for use in removing, softening or otherwise weakening the adhesive strength of the adhesive material. A pressurising bladder whereof at least a part of the surface is coated with the said fluid compound is inserted into the liner in a manner such that the said fluid compound comes into contact with the adhesive join and the said pressurising bladder is pressurised, forcing the fluid compound to interact with the adhesive material of the join, causing it to be softened. In an alternative embodiment of the invention, the fluid compound is provided in the adhesive-resistant coating that is applied to the inner surface of the attachment collar.

It is preferably advantageous to apply visible marks to the extender tube, connector portion and to any pressurizing bladder (if comprised in the embodiment), along with any rods or other apparatus which may be used to insert the bladder or liner. Such markings preferably improve accuracy and precision in positioning the repair liner within the pipe being lined and also allow alignment of the pressurising bladder in embodiments comprising such an apparatus. In embodiments comprising a pressurizing bladder, the pressurising bladder would be used particularly where a coating of fluid compound is used to soften an adhesive join between the liner and the extender tube or connector portion. In some embodiments, the fluid compound would be limited to a particular area on the surface of the pressurising bladder. In such embodiments, as discussed, it may therefore be advantageous that the extender tube and/or connector portion comprise a translucent or transparent material such that marks may be applied to the extender tube and/or connector portion prior to it being everted. The marks would then be discernible through the wall of the extender tube and/or connector portion after it has been everted. The discernible marks may be additionally applied to any of the pressurizing bladder or rod or other apparatus that used in conjunction with the liner.

FIG. 4 details an example method according to the second aspect of the present invention, using a liner as described in FIG. 1. The method comprises the steps of:

Providing a liner for insertion into a pipe, said liner comprising: an extender tube; a connector portion; and a liner tube; a first end of said extender tube being in substantially fluid tight communication with a first end of said connector portion; a second end of said connector portion forming a substantially fluid tight, detachable connection with a first end of said liner tube to form a first connection; said extender tube, connector portion and liner tube forming a continuous tubular construction which is capable of eversion; wherein the liner comprises a sealing member arranged to inhibit passage of a fluid from the liner tube to the extender tube or the connector portion;

Everting the liner such that said liner becomes positioned at a desired position in the pipe;

Applying a first force to said extender tube, said first force transmitted along said extender tube to detach the connector portion from the liner tube; and Removing said extender tube and said connector portion from said pipe.

It will be appreciated that the above described embodiments are given by way of example only and that various modifications thereto may be made without departing from the scope of the invention as defined in the appended claims.

The invention claimed is:

1. A liner for insertion into a pipe, said liner comprising:
an extender tube;
a connector portion; and
a liner tube;
a first end of said extender tube being in substantially fluid tight communication with a first end of said connector portion;
a second end of said connector portion forming a substantially fluid tight, detachable connection with a first end of said liner tube to form a first connection;
said extender tube, connector portion and liner tube forming a continuous tubular construction which is capable of eversion;
wherein the liner comprises a sealing member arranged to inhibit passage of a fluid from the liner tube to the extender tube or the connector portion; and
wherein said connector portion and/or said extender tube comprises a translucent material or a transparent material.

2. The liner of claim 1, wherein the liner comprises a lay-flat configuration, and wherein in the lay-flat configuration, the connector portion and the liner tube are substantially planar and each comprise a first substantially rectangular face and a second substantially rectangular face.

3. The liner of claim 2, wherein the sealing member is arranged to inhibit passage of a fluid from the liner tube to the extender tube or the connector portion when the liner is in the lay-flat configuration.

4. The liner of claim 1, wherein the sealing member is arranged to collapse an inner surface of said liner tube at a sealed portion, such that the sealed portion forms a substantially fluid tight seal.

5. The liner of claim 4, wherein the sealing member comprises a clamping member.

6. The liner of claim 5, wherein the clamping member comprises a first flat surface; and a second flat surface arranged to oppose the first flat surface; the first flat surface and the second flat surface being an adjustable distance from one another.

7. The liner of claim 6, wherein the first flat surface and the second flat surface comprise a compressive material.

8. The liner of claim 7, wherein the compressive material is rubber.

9. The liner of claim 8, wherein the clamping member comprises a compression member arranged to urge the first flat surface toward the second flat surface, such that a portion of the liner tube is compressed.

10. The liner of claim 9, wherein the liner tube comprises an absorbent material.

11. The liner of claim 10, wherein the absorbent material is one selected from the range: felt, fabric, mesh.

12. The liner of claim 11, wherein an interior surface of the connector portion and/or the extender tube comprises an adhesive-resistant material.

13. The liner of claim 12, wherein the adhesive-resistant material forms a coating layer on the interior surface.

14. The liner of claim 13, wherein a surface of the extender tube and/or the connector portion is arranged to accept and retain a marking applied thereto.

15. The liner of claim 14, wherein the marking is made using a writing implement.

16. The liner of claim 15, wherein the first connection comprises an adhesive material comprising an adhesive strength.

17. The liner of claim 16, wherein the adhesive strength of the adhesive material is arranged to be reduced during or following the communication of one selected from the range:
heat;
a solvent;
an oil-based material;
with the adhesive material.

18. The liner of claim 17, wherein the connector portion is part of the extender tube.

19. The liner of claim 18, wherein the first connection is provided using a limited strength adhesive material.

20. The liner of claim 19, wherein the first connection comprises a frangible material.

21. A method of repairing a pipe, the method comprising the steps of:
  a) providing a liner comprising:
    an extender tube;
    a connector portion; and
    a liner tube;
    wherein the extender tube and/or the connector portion comprises a translucent material;
    a first end of said extender tube being in substantially fluid tight communication with a first end of said connector portion;
    a second end of said connector portion forming a substantially fluid tight, detachable connection with a first end of said liner tube to form a first connection;
    said extender tube, connector portion and liner tube forming a continuous tubular construction which is capable of eversion;
    wherein the liner comprises a sealing member arranged to inhibit passage of a fluid from the liner tube to the extender tube or the connector portion;
  b) marking an exterior surface of the connector portion and/or the extender tube at a portion comprising the translucent or a transparent material;
  c) everting the liner such that said liner becomes positioned at a desired position in a pipe to be lined;
  d) applying a first force to said extender tube, said first force transmitted along said extender tube to detach the connector portion from the liner tube;
  e) removing said extender tube and said connector portion from said pipe.

22. The method of claim 21, wherein the first force comprises a peeling force or a breaking force.

23. The method of claim 21, wherein the desired position in a pipe to be lined is determined by the marking.

\* \* \* \* \*